May 13, 1952     T. C. BUSHONG     2,596,527
ROTARY HOE WHEEL
Filed Sept. 20, 1946     2 SHEETS—SHEET 1
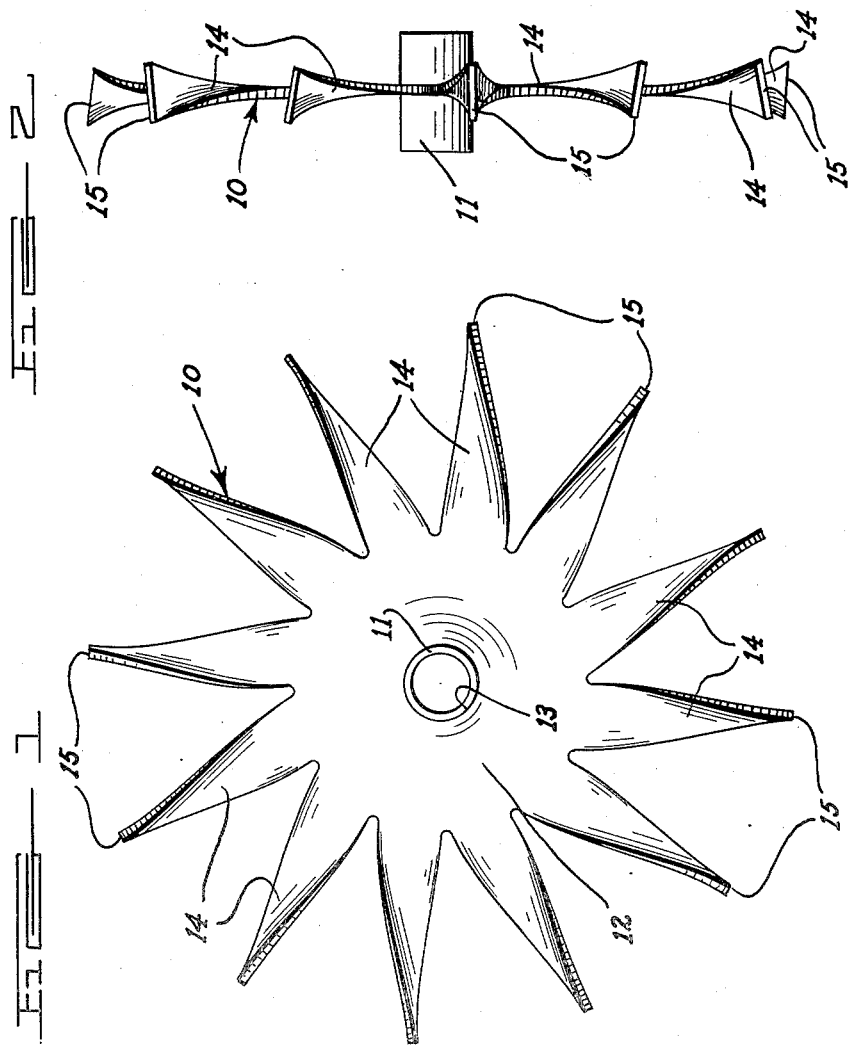
Inventor
TOLBERT CARSON BUSHONG
By *Clarence A. O'Brien and Harvey B. Jacobson*
Attorneys

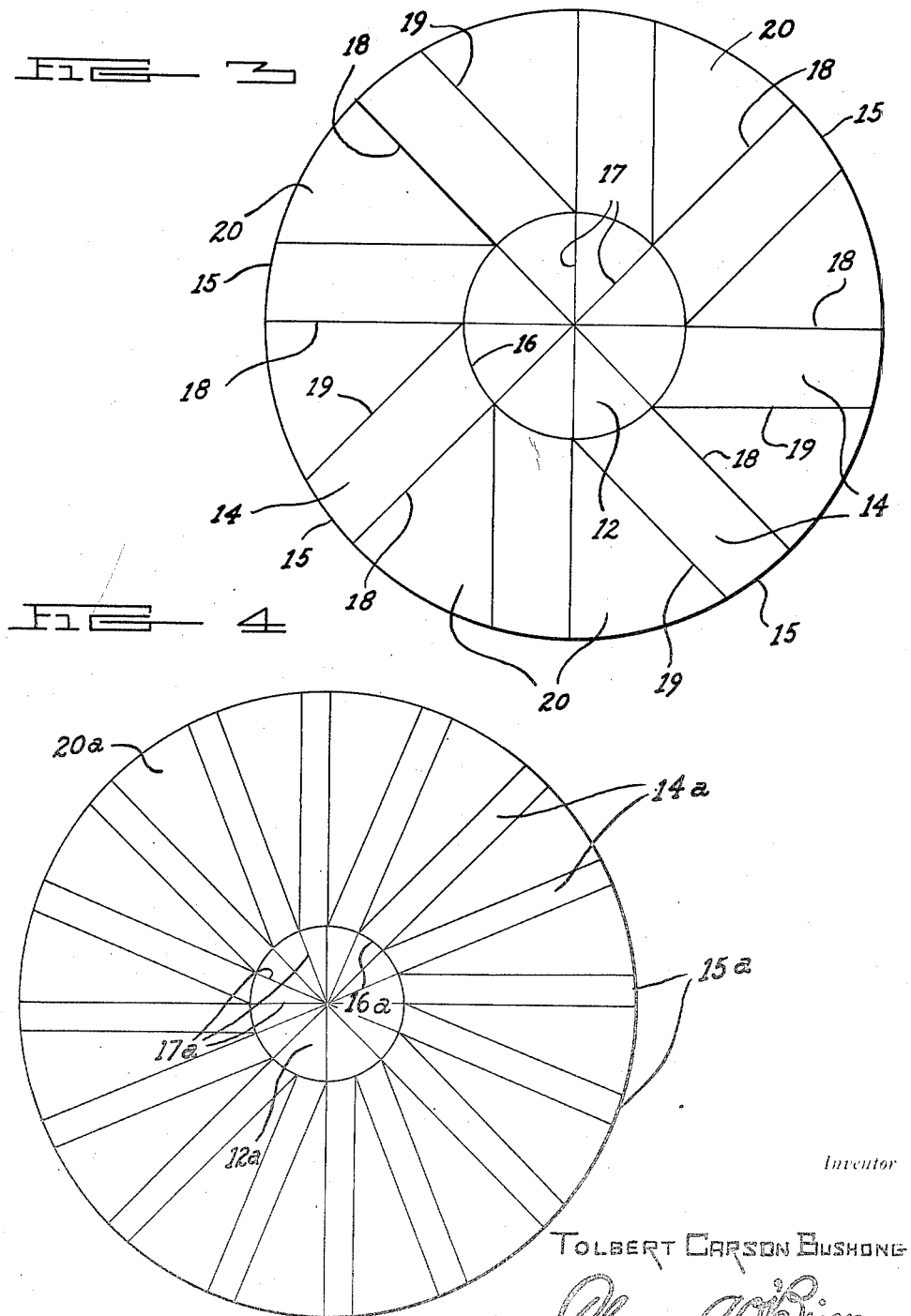

Patented May 13, 1952

2,596,527

UNITED STATES PATENT OFFICE 2,596,527

ROTARY HOE WHEEL

Tolbert Carson Bushong, Waveland, Ind.

Application September 20, 1946, Serial No. 698,279

2 Claims. (Cl. 97—212)

This invention relates to a rotary hoe and the method of making it, and has for its primary object to cultivate crops growing in the soil.

Another is to loosen the earth in a field to be planted, and to reduce clods and like lumps of earthy material to a relatively finely divided state.

A further object is to simplify the production of rotary hoes commonly employed in connection with agricultural implements.

The above and other objects may be attained by employing this invention which embodies among its features a hub, a disk shaped body carried by the hub and a plurality of peripheral teeth extending outwardly from the disk shaped body, opposite edges of opposed teeth on the body being coincidental with opposed radii radiating from the hub.

Other features of the invention embody scribing on one face of a metal disk, a root circle which is concentric with the periphery of the disk, cutting the disk along a plurality of spaced radii from its periphery to the root circle and cutting the disk along rectilinear paths lying parallel to the first made cuts, said second made cuts terminating at the junction of the first mentioned cuts and the root circle to form an angular row of outwardly extending teeth on the disk.

Still other features include twisting the teeth longitudinally from their root to their outer ends so that their outer ends lie perpendicular to the plane of the disk.

In the drawings:

Figure 1 is a side view of a rotary hoe embodying the features of this invention.

Figure 2 is an edge view of Figure 1,

Figure 3 is a side view of a disk illustrating the scribing of the root circle and the cutting of the radiating arms, and Figure 4 is a view similar to Figure 3 showing a modified form of rotary hoe.

In the drawings my improved rotary hoe designated generally 10 comprises a hub 11 to which a disk 12 is welded or otherwise secured. This disk 12 is provided with a central opening 13 which is concentrically arranged with relation to the disk 12, and radiating from the periphery of the disk are arms 14 which are twisted longitudinally so that outer edges 15 lie substantially perpendicular to the general plane of the disk 12.

In order to produce the rotary hoe illustrated in Figures 1 and 2 I select a circular metal body and scribe on its surface a root circle 16 (Fig. 3) which defines the disk shaped body 12 this root circle 16 is not only concentric with the periphery of the circular shaped metal body but also concentric with the center thereof so that it may be punched to form the opening 13 in which the hub 11 is received. Having laid out the root circle on one face of the disk I project through the center thereof a plurality of radii 17, scribing them on the face of the disk carrying the root circle 16 and then produce incisions 18 lying along the radii 17 which extend inwardly from the periphery of the sheet metal body to the root circle 16 as will be readily understood upon reference to Figure 3. Having produced the incisions 18 I next cut the sheet metal body to form incision 19 along rectilinear paths each of which extend parallel to an incision 18 from the periphery of the sheet metal body to the root circle 16 which incisions 19 intersect the root circle at its junction with the incision 18 of an adjacent tooth. In this manner segmental portions 20 are cut from the sheet metal body so as to produce an annular series of outwardly extending peripheral teeth on the disk 12 defined within the root circle 16. Having removed the segmental sections 20 from between the teeth 14 produced as above described, I next twist the teeth longitudinally so that their outer ends 15 lie substantially perpendicular to the general plane of the disk 12.

By the simple expedient of reducing the diameter of the root circle as suggested at 16a in Figure 4 and increasing the number of radii 17a, and then cutting out the segments 20a along lines extending inwardly from the periphery of the sheet metal body to the junction of the root circle 16a, following the same general pattern as that disclosed in Figure 3, I am enabled to produce a rotary hoe having an increased number of outwardly extending teeth 14a, the ends 15a of which may be twisted so as to lie in planes substantially perpendicular to the plane of the disk 12a. In this way, a rotary hoe is provided which will have a considerable greater number of teeth than that disclosed in Figure 3, and by properly laying out the radii and then producing the incisions as previously described, the number of teeth produced and their peripheral spacing may be varied to produce the desired degree of pulverization of the soil.

Conversely, by the simple expedient of increasing the diameter of the root circle but not increasing the number of radii, and forming incisions along rectilinear paths, each of which extends parallel to an incision from the periphery of the sheet metal body to the root circle, which incisions intersect the enlarged root circle at its junction with the incision of an adjacent tooth, the segmental portions become smaller, while the teeth become proportionally and correspondingly larger or wider, depending on the increased size of the root circle. This is sometimes desired or necessary to increase the degree of pulverization of the soil.

While in the foregoing there has been shown and described the preferred embodiment of this invention, it is to be understood that minor changes in the details of construction, combination and arrangement of parts may be resorted to without departing from the spirit and scope of the invention as claimed.

What I claim is:

1. A rotary hoe for operation on farm machinery comprising, a hub and a disk-shaped body carried on the hub, an even number of circumferentially spaced radially extending teeth on the body, each of said teeth being smoothly twisted about its longitudinal dimension throughout the entire length thereof with alternate teeth being twisted in the same direction and with intermediate teeth being twisted in the opposite direction, each of said teeth having an outer end edge that is oppositely inclined with respect to outer end edges of the teeth on the opposite sides thereof.

2. A rotary hoe for operation on farm machinery comprising, a hub and a disk-shaped body carried on the hub, an even number of circumferentially spaced radially extending teeth on the body, opposite edges of diametrically opposed teeth on the body being coincidental with opposed radii radiating from the axis of the hub, each of said teeth being smoothly twisted about its longitudinal dimension throughout the entire length thereof with alternate teeth being twisted in the same direction and with intermediate teeth being twisted in the opposite direction, each of said teeth having an outer end edge that is oppositely inclined with respect to outer end edges of the teeth on the opposite sides thereof.

TOLBERT CARSON BUSHONG.

REFERENCES CITED

The following references are of record in the file of this patent:

UNITED STATES PATENTS

| Number | Name | Date |
| --- | --- | --- |
| 369,163 | Clark | Aug. 30, 1887 |
| 1,002,172 | Myers | Aug. 29, 1911 |
| 1,718,541 | Dirschauer | June 25, 1929 |
| 1,797,824 | Dirschauer | Mar. 24, 1931 |
| 2,196,857 | Frechtling et al. | Apr. 9, 1940 |